(12) United States Patent
Cook (10) Patent No.: US 11,726,547 B1
(45) Date of Patent: Aug. 15, 2023

(54) INFORMATION HANDLING SYSTEM POWER SUPPLY INPUT VOLTAGE OPERATION MANAGEMENT SYSTEMS AND METHODS

(71) Applicant: Dell Products, L.P., Round Rock, TX (US)

(72) Inventor: Wayne Kenneth Cook, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 17/660,292

(22) Filed: Apr. 22, 2022

(51) Int. Cl.
*G06F 1/00* (2006.01)
*G06F 1/3296* (2019.01)
*G06F 1/3206* (2019.01)

(52) U.S. Cl.
CPC .......... *G06F 1/3296* (2013.01); *G06F 1/3206* (2013.01)

(58) Field of Classification Search
None
See application file for complete search history.

(56) References Cited

U.S. PATENT DOCUMENTS

2012/0110353 A1* 5/2012 Ehrlich ................. G06F 1/3203
713/300
2019/0227611 A1* 7/2019 Nam ...................... G06F 1/305

* cited by examiner

*Primary Examiner* — Nitin C Patel
(74) *Attorney, Agent, or Firm* — Fogarty LLP (57) ABSTRACT

An information handling system includes a power supply unit having a power train configured to convert electrical energy received by the power supply unit into electrical energy usable by the information handling system and a microcontroller that includes non-volatile memory holding a line status register. The microcontroller is configured to set or reset the power supply unit for high line only operation, and the information handling system is configured to notify the power supply unit microcontroller to set or reset the power supply unit for high line only operation.

20 Claims, 6 Drawing Sheets

| F7H | HIGH LINE ONLY SETTINGS | | | |
|---|---|---|---|---|
| BITS | NAME | VALUE | DESCRIPTION | NOTE |
| 7 | HIGH LINE OPERATION | 1 | HIGH LINE ONLY SET | READ ONLY |
| | | 0 | HIGH LINE ONLY CLEARED | |
| 6 | EXTENDED HIGH LINE AC VOLTAGE RANGE | 1 | 277V AVAILABLE | READ ONLY: DEFAULT VENDOR SETTING |
| | | 0 | 277V NOT AVAILABLE | |
| 5 | EXTENDED HIGH LINE NOMINAL AC VOLTAGE | 1 | 240V CAPABLE | READ ONLY: DEFAULT VENDOR SETTING |
| | | 0 | 240V NOT AVAILABLE | |
| 4 | HIGH LINE DC VOLTAGE | 1 | 230V CAPABLE | READ ONLY: DEFAULT VENDOR SETTING |
| | | 0 | 230V NOT AVAILABLE | |
| 3 | HIGH LINE OPERATION | 1 | HIGH LINE ONLY SET | READ/WRITE |
| | | 0 | HIGH LINE ONLY CLEARED | |
| 2 | EXTENDED HIGH LINE AC VOLTAGE RANGE | 1 | 277V SET | READ/WRITE |
| | | 0 | 277V NOT SET | |
| 1 | EXTENDED HIGH LINE NOMINAL AC VOLTAGE | 1 | 240V SET | READ/WRITE |
| | | 0 | 240V NOT SET | |
| 0 | HIGH LINE DC VOLTAGE | 1 | 230V SET | READ/WRITE |
| | | 0 | 230V NOT SET | |

INFORMATION HANDLING SYSTEM POWER SUPPLY INPUT VOLTAGE OPERATION MANAGEMENT SYSTEMS AND METHODS

FIELD

This disclosure relates generally to Information Handling Systems (IHSs), and, more specifically, to IHS power supply input voltage operation management.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Power Supply Units (PSUs) are devices that supply electrical power consumed by an IHS during normal operation. In many implementations, PSUs convert a mains AC power (e.g., 120 or 240 VAC) into a low-voltage, regulated DC power source (e.g., ±5 or ±12 VDC), using Switched-Mode Power Supply (SMPS) circuitry or the like. Many power supplies operate over a wide voltage range. For example, 90 to 264 VAC. Typically, an 1100 W PSU, for example, has roughly a maximum input current consumption of 12A while operating at 100 VAC and 6A while operating at 200 VAC.

SUMMARY

Embodiments of systems and methods for information handling system (IHS) power supply input voltage operation management are described. In an illustrative, non-limiting example, an IHS power supply unit (PSU) includes a power train configured to convert electrical energy received by the PSU into electrical energy usable by the information handling system and a microcontroller that includes non-volatile memory hosting a line status register. The microcontroller is configured to set or reset the PSU for high line only operation.

The microcontroller may set the PSU for high line only operation by determining whether the IHS has set a highline operation only function for the PSU, determining a current line status of the PSU, whether the PSU is established as a high line power supply and whether the PSU is a dual wattage rated power supply as a function of line status, and then, disabling a low line capability of the PSU, in response to a determination the PSU is established as a high line power supply and the PSU is a dual wattage rated power supply as a function of line status. In accordance therewith, the microcontroller may further advance setting the PSU for high line only operation by setting an input turn-off voltage of the PSU to a highline minimum turn-off voltage set by the IHS.

Also, the microcontroller may set the PSU for high line only operation by determining whether the PSU is established as a low line power supply and whether the PSU is a dual rated power supply as a function of line status. In response to a determination the PSU is established as a low line power supply or a determination the PSU is not a dual rated power supply as a function of line status, the PSU may be disabled. The PSU is maintained in a current operational state until a PS_ON signal from the IHS is disabled or high line only bits in the line status register are cleared. The microcontroller may disable the PSU through a PS_ON signal. In response to PS_ON being disabled, an indication that input voltage meets minimum input voltage requirements (Vin_Good) is de-asserted, if Vin_Good is asserted, then low line settings are set to high line settings in the line status register. In response to the low line settings being set to the high line settings in the line status register and the input voltage meeting a minimum input voltage turn-on level, Vin_Good is asserted.

The microcontroller may reset the PSU for high line only operation by determining whether the PSU is set as a high line only PSU in the line status register, whether the IHS has issued a notification to the PSU to clear high line operation in the line status register, whether the PSU is off due to low input voltage and whether the PSU is currently capable of operating on a high line input voltage. In response to a determination the PSU is off due to low input voltage and the input voltage meets a minimum low line input requirement, a high line only operation in the line status register is cleared and Vin_Good is asserted. In response to the PSU being set as a high line only PSU in the line status register, the PSU is disabled by de-asserting PS_ON. The PSU is maintained in a current operational state until PS_ON is disabled or the IHS sets high line only operation. In response to PS_ON being de-asserted, Vin_Good is de-asserted and high line only settings in the line status register are disabled. In response to disabling high line only settings in the line status register and the input voltage meeting a minimum input voltage turn-on level Vin_Good is asserted.

Further, the IHS may be configured to notify the PSU microcontroller to set or reset the PSU for high line only operation. Whereby, the IHS may be configured to determine whether high line only operation has been enabled and notify the PSU to clear one or more high line only bits in the PSU line status register, in response to a determination high line only operation has not been enabled. However, in response to a determination high line only operation has been enabled, the IHS may determine whether a high line service voltage is selected, and in response to a determination a high line service voltage is not selected, notify the PSU to set one or more high line only bits in the PSU line status register. However, in response to a determination the high line service voltage is selected, the IHS may notify the PSU to set a high line service voltage bit corresponding to a selected high line service voltage in the PSU line status register.

The line status register may include high line only operation settings that include a universal high line voltage setting, based at least in part on a nominal voltage range capability of the PSU, one or more specific high line voltage settings based, at least in part, on a nominal voltage range capability of the PSU.

Thus, an IHS PSU input voltage operation management process for setting, by a PSU microcontroller, the PSU for high line only operation may include determining, by the PSU microcontroller, whether the IHS has set a highline operation only function for the PSU and in response to a determination the IHS has set a highline operation only function for the PSU, setting, by the PSU microcontroller, the PSU for high line only operation. This may include determining a current line status of the PSU, whether the PSU is established as a high line power supply and whether the PSU is a dual wattage rated power supply as a function of line status, and disabling a low line capability of the PSU, in response to a determination the PSU is established as a high line power supply and the PSU is a dual wattage rated power supply as a function of line status.

Also, the IHS PSU input voltage operation management process for setting, by a PSU microcontroller, the PSU for high line only operation may include determining, by the PSU microcontroller, whether the PSU is established as a low line power supply and whether the PSU is a dual rated power supply as a function of line status, and in response to a determination the PSU is established as a low line power supply and the PSU is a dual rated power supply as a function of line status, setting, by the PSU microcontroller, the PSU for high line only operation. This may include disabling the PSU, in response to a determination the PSU is established as a low line power supply or a determination the PSU is not a dual rated power supply as a function of line status, maintaining the PSU in a current operational state until a PS_ON signal from the IHS is disabled or high line only bits in the line status register are cleared, de-asserting Vin_Good, in response to PS_ON being disabled, if Vin_Good is asserted, then setting low line settings to high line settings in the line status register, and asserting Vin_Good, in response to the low line settings being set to the high line settings in the line status register and the input voltage meeting a minimum input voltage turn-on level.

Further, the IHS PSU input voltage operation management process for resetting, by a PSU microcontroller, the PSU for high line only operation may include determining, by the PSU microcontroller, whether the PSU is set as a high line only PSU in the line status register, whether the IHS has issued a notification to the PSU to clear high line operation in the line status register, whether the PSU is off due to low input voltage and whether the PSU is currently capable of operating on a high line input voltage and in response to a determination that the PSU is set as a high line only PSU in the line status register, the IHS has issued a notification to the PSU to clear high line operation in the line status register, the PSU is off due to low input voltage or the PSU is currently capable of operating on a high line input voltage, resetting, by the PSU microcontroller, the PSU for high line only operation. This may include resetting the PSU for high line only operation in response to a determination the PSU is set as a high line only PSU in the line status register, the IHS has issued a notification to the PSU to clear high line operation in the line status register, the PSU is off due to low input voltage or the PSU is currently capable of operating on a high line input voltage. This may further include clearing a high line only operation in the line status register and assert Vin_Good in response to a determination the PSU is off due to low input voltage and the input voltage meeting a minimum low line input requirement, disabling the power supply by de-asserting PS_ON in response to the PSU being set as a high line only PSU in the line status register, maintaining the PSU in a current operational state until PS_ON is disabled or the IHS sets high line only operation, de-asserting Vin_Good and disabling high line only settings in the line status register, in response to PS_ON being de-asserted, and asserting Vin_Good, in response to disabling high line only settings in the line status register and the input voltage meeting a minimum input voltage turn-on level.

The IHS PSU input voltage operation management process for setting and resetting, by a PSU microcontroller, the PSU for high line only operation may also include determining whether the PSU is mismatched with another PSU in the IHS, and toggling, in response to a determination that the PSU is mismatched with another PSU in the IHS, Vin_Good, enabling resetting of the PSU.

The microcontroller may also reset high line only operation of the PSU outside the IHS. Whereby, when PS_Kill is not pulled low and input voltage to the PSU is above a minimum specified operational voltage of the PSU, the microcontroller may reset high line only line status register bits to default settings.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
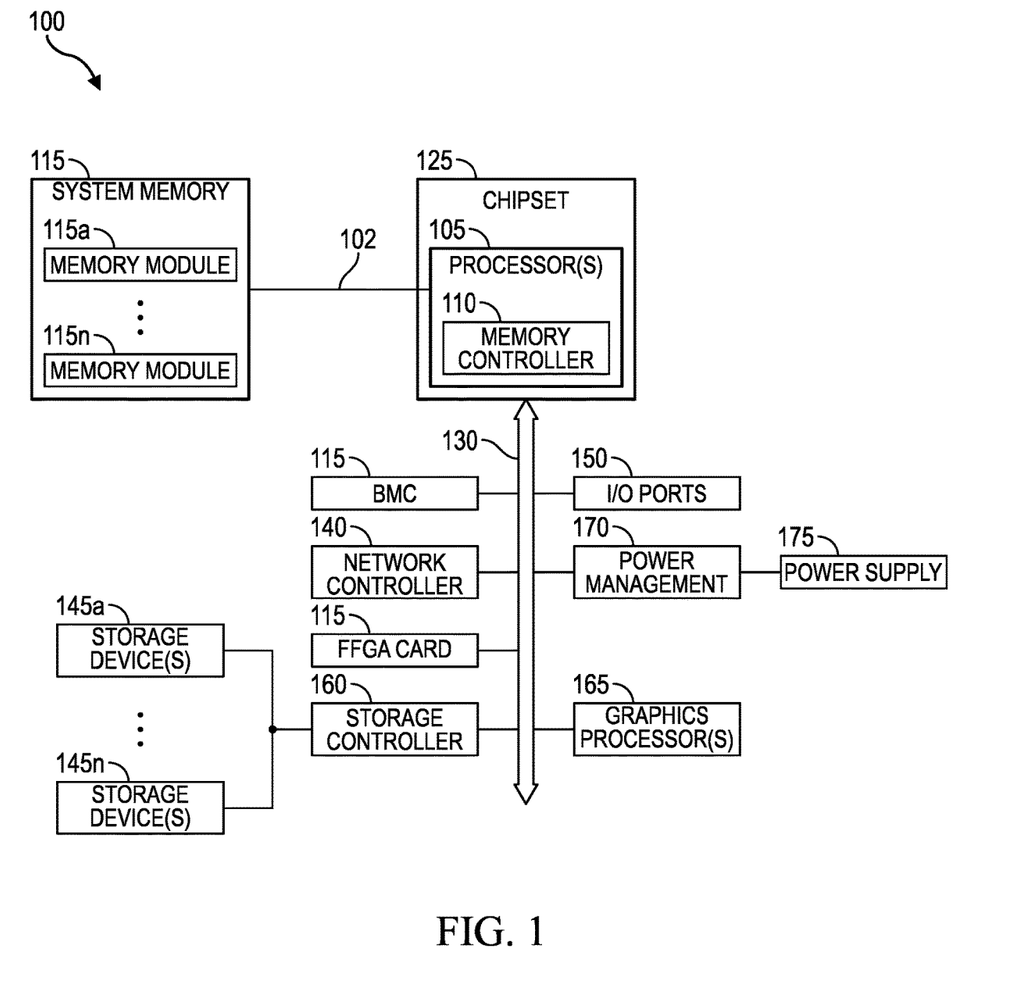
FIG. 1 is a block diagram illustrating components of an example of an Information Handling System (IHS), according to some embodiments.

FIG. 1 is a block diagram illustrating components of example IHS 100, in which embodiments of the present systems and methods for power supply input voltage operation management may be implemented. IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS 105 via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115a-n. Each of the removable memory modules 115a-n may correspond to a printed circuit board memory socket that receives a removable memory module 115a-n, such as a DIMM (Dual In-line Memory Module), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a PCIe switch fabric that is accessed via a PCIe root complex.

As illustrated, IHS 100 includes BMC 135 to provide capabilities for remote monitoring and management of various aspects of IHS 100. In support of these operations, BMC 135 may utilize in-band, sideband and/or out of band communications with certain managed components of IHS 100, such as, for example, processor(s) 105, system memory 115, chipset 125, network controller 140, storage device(s) 145, etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, TPM (Trusted Platform Module) connection ports, HDMI ports, audio ports, docking ports, network ports, Fibre Channel ports and other storage device ports. Such I/O ports 150 may be externally accessible or may be internal ports that are accessed by opening the enclosure housing IHS 100. Through couplings made to these I/O ports 150, users may couple the IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145a-n that are accessible via the chassis in which IHS 100 is installed. Storage controller 160 may provide support for RAID (Redundant Array of Independent Disks) configurations of logical and physical storage devices 145a-n. In some embodiments, storage controller 160 may be an HBA (Host Bus Adapter) that provides more limited capabilities in accessing physical storage devices 145a-n. In some embodiments, storage devices 145a-n may be replaceable, hot-swappable storage devices that are installed within bays provided by the chassis in which IHS 100 is installed. In embodiments where storage devices 145a-n are hot-swappable devices that are received by bays of chassis, the storage devices 145a-n may be coupled to IHS 100 via couplings between the bays of the chassis and a midplane of IHS 100.

In some embodiments, storage devices 145a-n may also be accessed by other IHSs that are also installed within the same chassis as IHS 100. Storage devices 145a-n may include SAS (Serial Attached SCSI) magnetic disk drives, SATA (Serial Advanced Technology Attachment) magnetic disk drives, solid-state drives (SSDs) and other types of storage devices in various combinations.

Processor(s) 105 may also be coupled to a network controller 140 via bus 130, such as provided by a Network Interface Controller (NIC) that allows the IHS 100 to communicate via an external network, such as the Internet or a LAN. In some embodiments, network controller 140 may be a replaceable expansion card or adapter that is coupled to a motherboard connector of IHS 100. In some embodiments, network controller 140 may be an integrated component of IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by a remote access controller. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use. As described in additional detail below, embodiments may utilize an inventory certificate that is stored to the IHS during factory provisioning and that specifies the factory-provisioned I/O ports 150 of IHS 100. Embodiments may utilize such an inventory certificate during a pre-boot initialization of IHS 100 in order to enable, such as through BIOS configurations, only these factory-provisioned I/O ports 150 of IHS 100.

In some embodiments, IHS 100 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. These calculated hash values may then be compared against reference hash values that were previously stored in a secure non-volatile memory of the IHS, such as during factory provisioning of IHS 100. In this manner, a TPM may establish a root of trust that includes core components of IHS 100 that are validated as operating using instructions that originate from a trusted source.

In certain embodiments, a graphics processor 165 may be comprised within one or more video or graphics cards, or an embedded controller, installed as components of the IHS 100. A variety of additional components may be coupled to processor(s) 105 via bus 130. For instance, processor(s) 105 may also be coupled to a power management unit 170 that may interface with a Power Supply Unit (PSU) 175 of IHS 100, such as to implement aspects of the present systems and methods for PSU input voltage operation management, in accordance with embodiments, such as described below.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip (SoC).

Figure 2:
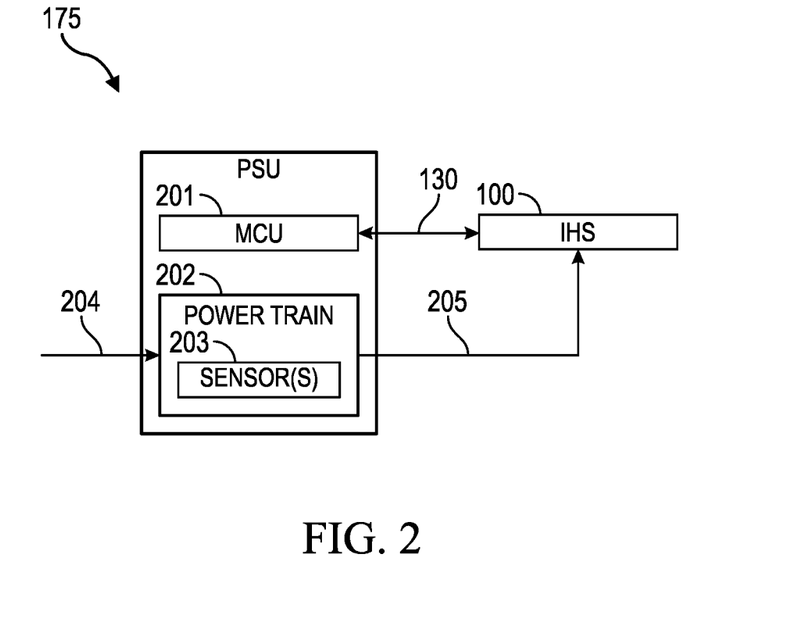
FIG. 2 is a block diagram of an example Power Supply Unit (PSU) coupled to an IHS, according to some embodiments.

FIG. 2 is a block diagram of example PSU 175 coupled to IHS 100. Generally speaking, PSU 175 is a system, device, or apparatus configured to supply electrical power to one or more electronic hardware components of IHS 100. Particularly, illustrated PSU 175 includes microcontroller (MCU) 201, power train 202, and sensor(s) 203. PSU 175 also includes input line(s) 204 and main output line 205. PSU 175 may, in some embodiments, receive backup power or secondary bias from another PSU, which may also be coupled to, or otherwise associated with IHS 100. Conversely, another such PSU may receive backup power or secondary bias from PSU 175.

In accordance with various embodiments, MCU 201 is coupled to power management unit 170 within IHS 100. As noted, in some embodiments power management may be incorporated into, or otherwise performed by BMC 135 of the IHS. In such embodiments, MCU 201 may be coupled to BMC 135, within IHS 100, via control bus 130, as illustrated. MCU 201 may comprise a microprocessor, Digital Signal Processor (DSP), Application Specific Integrated Circuit (ASIC), Field-Programmable Gate Array (FPGA), Electrically Erasable Programmable Read-Only Memory (EEPROM), or any combination thereof, or any other device, system, or apparatus for controlling operation of its associated PSU 175. As such, each MCU 201 may comprise firmware, logic, and/or data for controlling the operation of PSU 175.

Power train circuit 203 may include a suitable system, device, or apparatus for converting electrical energy received by each PSU 175 (e.g., a 120, 240, or 277 VAC source or a 48 or 200 to 380 VDC source) into electrical energy usable by IHS 100 (e.g., as a 5 or 12 VDC source). In some embodiments, power train circuit 162 may comprise a rectifier, a voltage regulator (e.g., a multi-phase voltage regulator), and/or the like.

Sensor(s) 203 may be communicatively coupled to MCU 201 and may include any system, device, or apparatus configured to communicate a signal to MCU 201 indicative of an electrical voltage or current at input line 204, an electrical voltage or current at an output line 205, a temperature of power train circuit 202 (e.g., a converter, a heatsink, a transistor, etc.), an ambient temperature (e.g., an IHS chassis' inlet air temperature), or the like.

Power delivery infrastructure limitations, either at a server rack level or a data center level, can be observed at Power Distribution Unit (PDU), branch power distribution, data center transformers and/or Uninterrupted Power Supply (UPS) level(s). For example, a 15A branch power distribution is typically limited to 12A at nominal voltages by product safety agencies, or the like. Therefore, the typical maximum power available is approximately 1200 W at 100 VAC and 2400 W at 200 VAC. PSU efficiency and internal loads (microcontroller, fan) further reduce the maximum power available to an associated IHS. In light of these power delivery infrastructure limitations, embodiments of the present systems and methods may control the amount of current that is being consumed so as not to overload the power network.

As noted, many power supplies operate over a wide voltage range. For example, 90 to 264 VAC. Typically, an 1100 W PSU, for example, has roughly a maximum input current consumption of 12A while operating at 100 VAC and 6A while operating at 200 VAC. As a result, at "high line" roughly twice as many PSUs can be operated on a given 15A branch. However, data centers typically design their power infrastructures for high line operation, which means that in the event of a voltage brownout the power grid can be overloaded resulting in breakers being tripped. Tripping breakers at a data center can be a major inconvenience to an end user, etc. Embodiments of the present systems and methods provide a means by which a wide range PSU can be set to operate only at a high line condition, through a PSU feature that can be enable via the PSU's IHS.

Typically, upon application of an input voltage to a PSU a line status of operation is established. If the PSU is a dual rated unit the BMC and/or power management unit (microcontroller) makes a determination whether to enable the unit or to mismatch it based upon other operational units in the IHS, server rack the IHS is operating in, or the like. If the PSU is a single rated unit over the application of a wide range input voltage, the IHS will enable the unit, unless, as mentioned, the unit has a different wattage rating than other operational units in the IHS, server rack the IHS is operating in, or the like. As noted, a wide range PSU will draw roughly two times the input current when operation at low line (120 VAC) verses an equivalent unit operating at high line (240 VAC). If the rated wattage of multiple PSUs in the IHS are the same which the server rack the IHS is operating in, or the like, regardless of whether each PSUs input voltage is a high line or a low line voltage the system will allow the PSUs to be enabled.

Since there are certain applications where it may not be desirable to have a PSU operate at low line input voltages, embodiments of the present systems and methods provide PSU input voltage operation management. Through the use an intelligent in-system power monitoring manager (IPMM) command, the IHS can program a PSU to only operate as a high line PSU. Although, it may be desirable to set a PSU as a high line PSU prior to enabling the PSU, the PSU maybe programmed at any time in accordance with embodiments of the present systems and methods.

Figure 3:
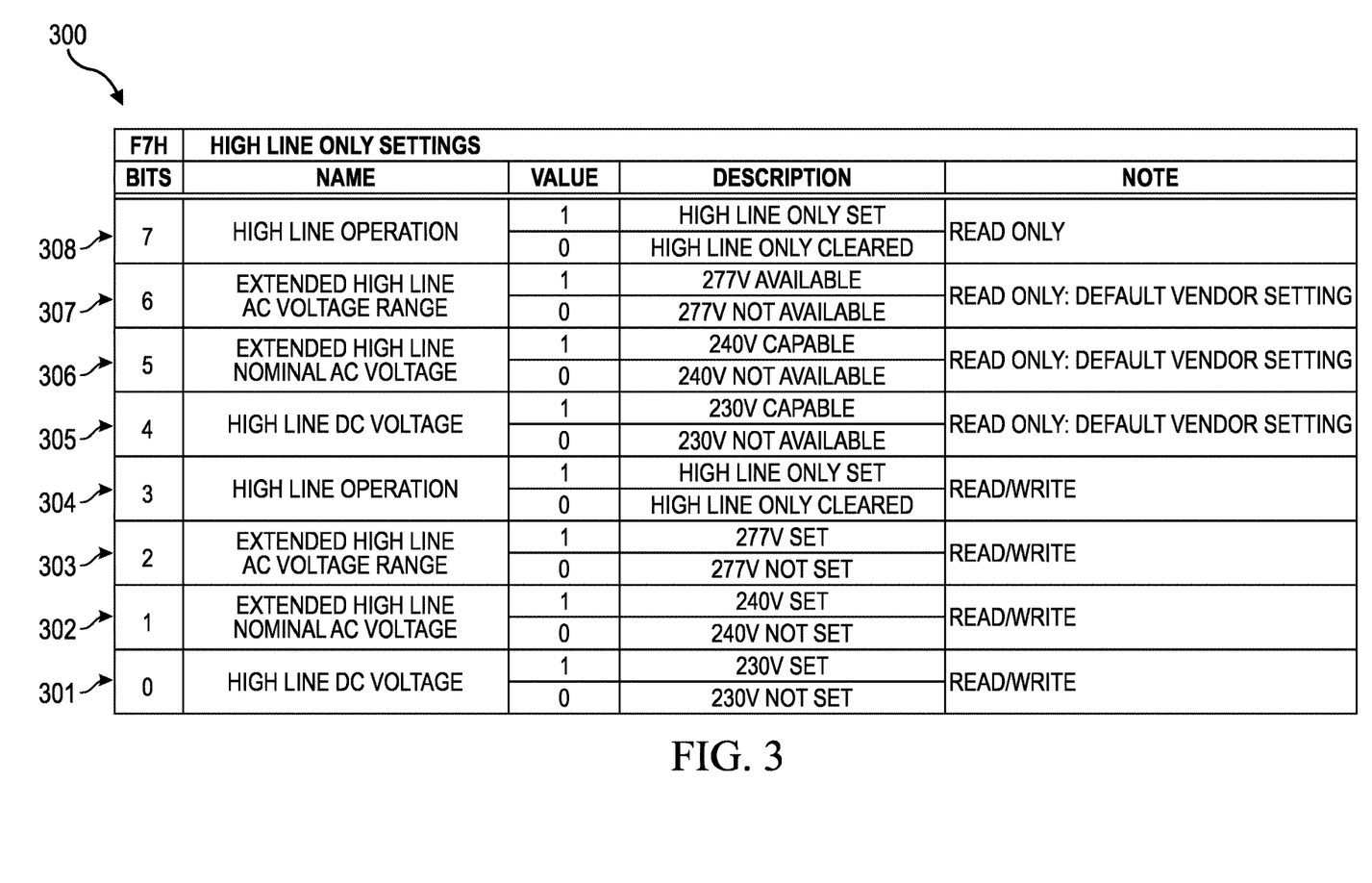
FIG. 3 is a chart showing an example PSU line status register (F7h) which includes high line only operation settings, according to some embodiments.

The high line only function operation implemented in accordance with embodiments of the present systems and methods is stored in non-volatile memory. FIG. 3 is a chart showing example PSU line status register (F7h) 300 which includes high line only operation settings 301 through 308, according to some embodiments. PSU line status register (F7h) 300 may be maintained in non-volatile memory, or the like, of MCU 201, or the like, of PSU 175, and may be set via an interface provided by IHS 100, or the like.

As noted, PSUs may operate over a wide range of voltages (e.g., 90 to 264 VAC). A high line only function provided and enabled in accordance with embodiments of the present systems and methods, allows a PSU to be set as a wide range high line only PSU (e.g., 180 to 264 VAC), such as by the user setting bit-3 (304) high (to a value of 1).

Additionally, once set as a high line only PSU, or alternatively, the PSU may be set as a set-line service PSU, as listed for the user to select, for example, by the user setting one of bits 0 through 2 (301-303) high (to a value of 1) (e.g., setting bit-1 high for 240 VAC+1-10%), or the like.

As detailed further below, a user can elect to enable or disable high line only operation by setting or clearing, respectively, bit-3 (304) of PSU line status register (F7) (300). In accordance with various embodiments, setting of the high line only bit should be set prior to enabling PS_ON for the PSU. Although, the bit can, in accordance with embodiments of the present systems and methods, be set at any time but if the PSU is operating as a low line PSU the IHS may turn the PSU off through a PS_ON signal so that the PSU makes the entered changes, as detailed further below.

However, in accordance with embodiments of the present systems and methods, the high line only function(s) (301 through 304 and 308) may not be set (high) as a default (from the factory). That is, F7 bits 0, 1, 2,3 & 7 (301 through 304 and 308) may, by default, be set to "0."

Embodiments of the present systems and methods enable setting and resetting high line only operation of a PSU and enables a user to set various options to the line service provided to the IHS, via the IHS. Embodiments of the present systems and methods stores high line operation settings in non-volatile memory which allows the PSU to retain its high line only status even when power is completely removed from the PSU. Embodiments of the present systems and methods also provide user-visible high line only settings, via the IHS. Also, embodiments of the present systems and methods may enable resetting of a PSU to initial factory settings when removed from the system.

Figure 4A:
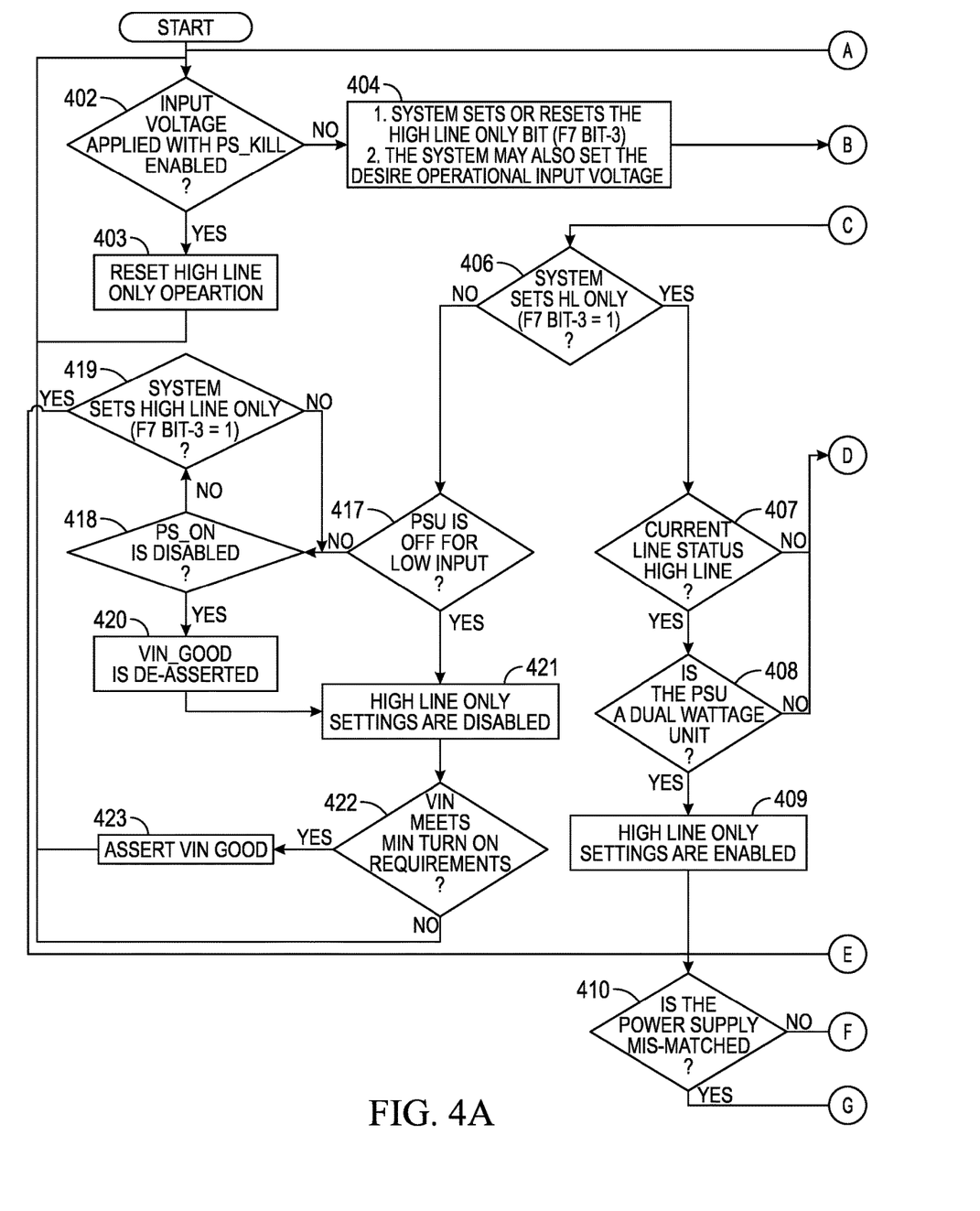
FIGS. 4A and 4B together form a flowchart of PSU operation, according to some embodiments.
Figure 4B:
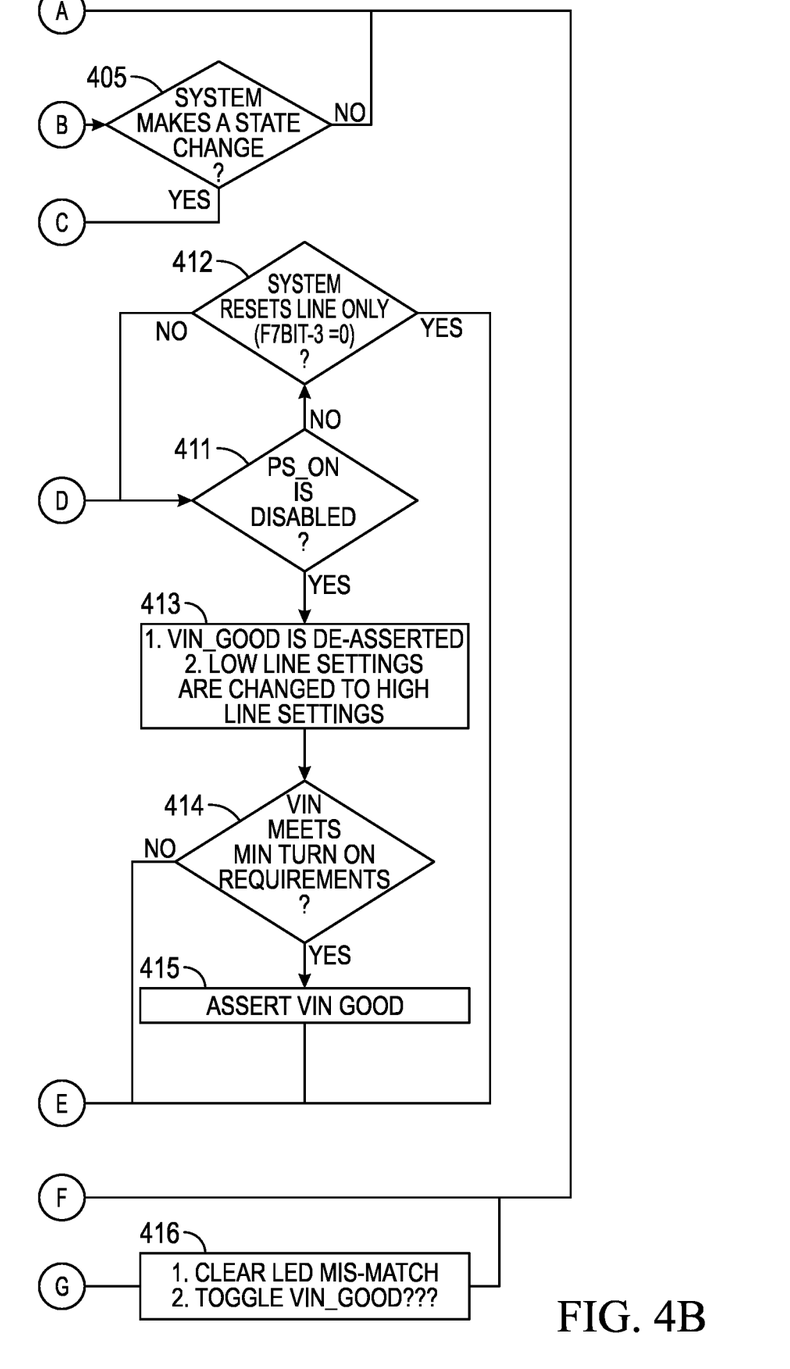

FIG. 4 is a flowchart of PSU operation in accordance with example embodiments of the present systems and methods. Illustrated process 400 may be performed by an MCU (201) of a PSU (175), or the like. As noted, an MCU may be coupled to a power management unit (170) within an IHS (100), and in some embodiments power management may be incorporated into, or otherwise performed by a BMC (135) of the IHS and the MCU coupled to the BMC within the IHS 100 via a control bus (130), or the like. Thus, in some embodiments, the BMC may be in communication with the MCU to exchange control telemetry information in order to implement method 400. In this example, operations of method 400 may be performed by the MCU of the PSU.

At start 401 an input voltage (204) is applied to the PSU and at 402 a determination is made by the PSU (e.g., by PSU MCU 201) whether this input voltage has been applied with PS_Kill enabled for the PSU. If it is determined at 402 that PS_Kill is enabled, the PSU resets highline only operation, in accordance with embodiments of the present systems and methods, at 403, such as by clearing bits 0 through 3 (301 through 304) of the PSU line status register (F7h) (300) (set to a value of 0) and process 400 restarts.

If it is determined at 402 that PS_Kill not enabled, the PSU then reviews its PSU line status register (F7h) at 404 to resolve whether the IHS has set or reset the PSU to highline only operation (e.g., set PSU line status register F7h bit-3 high (to a value of 1)) and/or the IHS has set a fixed operational input voltage, such as by setting PSU line status register F7h bits 0 through 3 (301-304, respectively). Based thereupon, the PSU may determine at 405 whether this is a state change. If not, the PSU operates as set and process 400 restarts. However, if it is determined at 405 that the line status register (F7h) has changed it is determined at 406 whether the IHS has set the PSU to high line only by setting line status register bit-3 high (to a value of 1). As noted, this may be a default (read only) setting under various embodiments of the present systems and methods.

As noted, the high line only function operation implemented in accordance with embodiments of the present systems and methods is stored in non-volatile memory. When a PSU is first powered on in a system, the high line only function is checked, prior to the assertion of Vin_Good to set the appropriate operating condition of the PSU.

Thusly, if it is determined at 406 that the IHS has set the PSU to high line only by setting line status register bit-3 the PSU determines, at 407, if the current line status of the PSU is high line. If the PSU's IHS set (e.g., an IHS user has selected to set) the highline operation only function, the PSU will check its current line status. If the PSU has currently established itself as a high line PSU, and it is a dual wattage rated PSU as a function of line status, then the low line capability of the PSU is disabled. The PSU's input turn-off voltage is set to the selected highline minimum turnoff voltage. Therefore, if it is determined at 407 that the current line status of the PSU is high line, then a determination is made at 408 whether the PSU is a dual wattage PSU. If it is determined at 408 that the PSU is a dual wattage PSU, the high line settings are enabled at 409 and operation of the PSU proceeds to a determination at 410 whether the PSU is mis-matched in the IHS (i.e., identifying a mismatch between a first PSU and a second PSU in the IHS).

If the PSU has established itself as a low line PSU, or it is not a dual rated PSU as a function of line status (i.e., is a single rated power supply), the IHS may disable the PSU through PS_ON. The PSU will remain in its current operational state until PS_ON is disabled, or the IHS (or user) clears the high line only operation (e.g., clears F7h bit-3). Once PS_ON has been disabled Vin_Good is de-asserted, unless it was previously de-asserted, then the low line settings are set to the high line settings. Once all the settings have been changed then Vin_Good can assert itself if the input voltage meets a required input voltage's minimum turn-on level. Thus, if it is determined at 407 that the current line status of the PSU is not high line, then a determination is made at 411 whether the PSU has been disabled, such as through PS_ON being disabled by the IHS. If it is determined at 411 that the PSU has not been disabled, process 400 proceeds to 412, where the PSU determines whether its IHS has reset highline only operation, that is, whether the IHS has cleared F7h bit-3 (i.e., set F7h bit-3 low). If it is determined at 412 that the IHS has reset highline only operation, then process 400 proceeds to determining whether the PSU is mismatched at 410. However, if it is determined at 412 that the IHS has not reset highline only operation, then process 400 returns to determining at 411 whether proceeds to determining whether the PSU has been disabled, such as through PS_ON being disabled by the IHS. If it is determined at 411 that the PSU has been disabled, such as through PS_ON being disabled by the IHS, then, as shown at 413, Vin_Good (i.e., voltage input good state) has been de-asserted, and low line settings may be changed, in accordance with embodiments of the present systems and methods, to high line settings, also at 413. Then at 414 a determination is made whether the voltage into the PSU (Vin) meets minimum PSU turn-on requirements. If the Vin meets minimum PSU turn-on requirements at 414, Vin_Good is asserted by the PSU at 415 and operation of the PSU proceeds to a determination at 410 whether the PSU is mis-matched in the IHS.

If it is determined at 410 that the PSU is mismatched with another PSU in the IHS, particularly where one PSU is operating on low line and another otherwise matched PSU is operating on high line, it may be desirable to clear the low line condition of the mismatched, low line PSU. At 416, to clear the mismatch, Vin_Good is toggled, such as to enable reassessment of the PSU by restarting process 400, at 402. Generally speaking, the first PSU to begin operating in an IHS dictates the wattage, and hence the matching, of PSUs in the IHS.

Returning to 406, If it is determined at 406 that the IHS has not set the PSU to high line only by setting line status register bit-3, the PSU determines, at 417 whether the PSU is off for low input. If it is determined at 417 the PSU is not off for low input, a determination is made at 418 whether PS_ON is disabled for the PSU. If it is determined at 418 that PS_ON is not disabled, a determination is made at 419 whether high line only operation has been set at the IHS level, such as by the IHS setting F7h bit-3 high. If it is determined at 419 that the IHS has set high line only operation (i.e., set F7h bit-3 high) process 400 proceeds to 410, where the PSU determines whether the PSU is mismatched in the IHS, etc., as described above.

In the event where the PSU is currently running as a high line PSU, the system will need to disable the PSU by de-asserting PS_ON. The PSU will remain in its current operational state until PS_ON is disabled or the system decided to set the high line only operation. Once PS_ON is de-asserted, Vin_Good is de-asserted and the high line only settings are disabled. Once all the settings have been changed then Vin_Good can assert itself if the input voltage meets the require input voltage minimum turn-on levels. Thus, if a determination is made at 419 by the PSU that the IHS has not set high line only (e.g., F7h bit-3 is low) process 400 returns to 418 to determine whether PS_ON is disabled. If it is determined at 418 that PS_ON is disabled, Vin_Good is de-asserted at 420, and at 421 the F7h highline only settings (301 through 304 and 308) are disabled.

When the PSU is currently set as a high line only unit and the IHS clears F7 bit-3 the PSU is either off due to low input voltage (currently the input voltage is low line) or is currently capable of operating on a high line input voltage. If the PSU is off due to low input voltage, then the PSU will clear its high line only capability and assert Vin_Good if the input voltage meets the minimum low line input requirements. Thus, if it is determined at 417 the PSU is off for low input, the highline only settings (301 through 308) are disabled at 421. Then at 422 it is determined whether Vin meets minimum (Min) turn on requirements for the PSU. If the PSU determines at 422 that Vin meets Min turn on requirements for the PSU, Vin_Good is asserted at 423, placing the PSU in operation and process 400 restarts. Otherwise, when the PSU determines at 422 that Vin does not meet Min turn on requirements for the PSU, the PSU remains in the off state and process 400 restarts, the PSU only restarting when minimum input voltage conditions are met.

Figure 5:
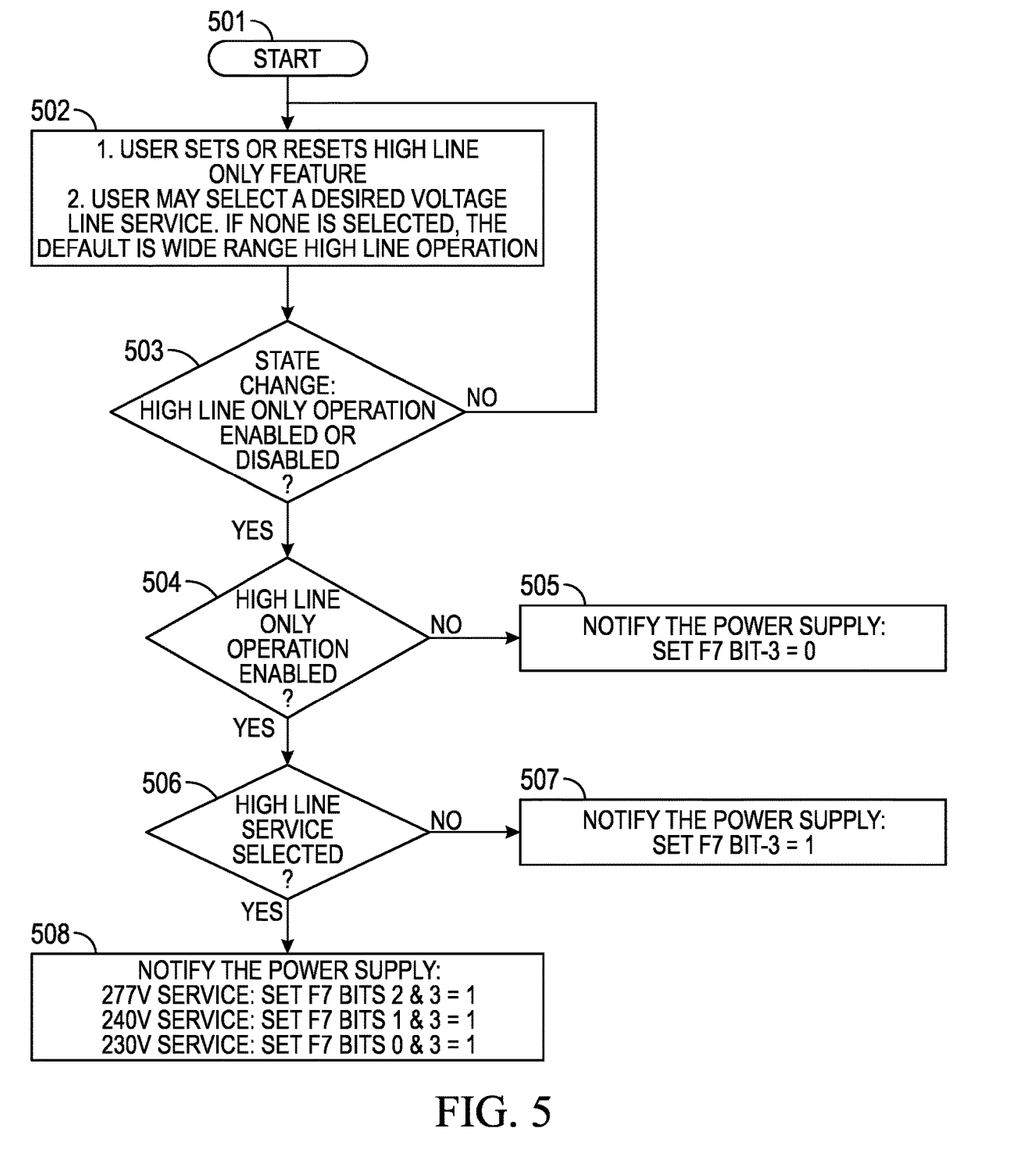
FIG. 5 is a flowchart for user setting of a high line only PSU function, via the PSU's IHS, according to some embodiments.

FIG. 5 is a flowchart of process 500, for user setting of a high line only PSU function, via the PSU's IHS, in accordance with example embodiments of the present systems and methods. As noted, a PSU's MCU (201) may be coupled to a power management unit (170) within an IHS (100), and in some embodiments power management may be incorporated into, or otherwise performed by a BMC (135) of the IHS and the MCU coupled to the BMC within the IHS 100 via a control bus (130), or the like. In process 500 a user may set, or reset, the high line only feature, in accordance with embodiments of the present systems and methods and at the same time select (an) other desired setting(s), at the same time or at different times. In some embodiments, the BMC and/or power management unit may communicate with the MCU to exchange control information in order to implement method 500, particularly to notify the PCM MCU of bit setting changes.

Process 500 starts at 501 when the IHS is running. The IHS may present a user a Graphical User Interface (GUI) running on the IHS. In accordance with various embodiments of the present systems and methods, the GUI, or the like provided by the IHS may present the available settings for the IHS's PSU(s) indicating the PSU(s) is (are) capable of supporting the particular settings.

The high line only option may be reset by, or using, the IHS. Thus, at 502 a user may set, or reset, the high line only feature of the present systems and methods, such as via the GUI. This results in F7h bit-3 being set high. At 502, the user may also, or alternatively, such as where the high line feature is already selected (i.e., F7h bit-3, or bit-7, set high) select a desired voltage line service (F7h bit-0, 1 or 2), such as via the GUI. That is, additionally at 502, if the user elects to select a highline service, the user may select 277 VAC, but the IHS may only set the PSU to operate at 277 VAC at 502 only if the PSU has this capability. Alternatively, the user may select to set the PSU to operate on a 240 VAC line service, which the IHS notifies the PSU to set, as discussed below. As a further alternative, the user may select to set the PSU to operate on a 230 VAC line service, which the IHS notifies the PSU to set, as discussed below. If no voltage line service is selected, in this manner, by the user, a default wide range high line operation is set by the IHS (e.g., only F7h bit-3 is set by the IHS).

At 503 the IHS determines whether a state change has occurred, whether high line only operation has been enabled, or disabled. If no state change is detected at 503, process 500 stays in a loop, with the IHS waiting for a user to set or reset the high line only feature, or select (an) other desired high line voltage line service setting(s) (at 502). However, if the IHS detects a state change at 503, the IHS then determines at 504 whether high line only operation is enabled. If the IHS determines at 504 that high line only operation is not enabled, the IHS notifies the PSU, such as by notifying the MCU of the PSU, to set F7h bit-3 to zero (i.e., clear F7h bit-3) at 505.

However, when selecting the high line only feature in accordance with embodiments of the present systems and methods, the user has the following options available, set a universal high line setting which can either be 200 to 240 VAC nominal range or 200 to 277 VAC nominal range, such as may depend upon the PSU's capability (e.g., whether 277 VAC input is supported by the PSU and/or whether 277 VAC input voltage is available at the installation site). Thus, if the IHS determines at 504 that high line only operation is enabled, then, at 506, the IHS determines whether a high line service (i.e., a high line service voltage) is selected. If the IHS determines at 506 that high line service (voltage) is not selected, the IHS notifies the PSU to set only F7h bit-3 high (i.e., set F7h bit-3 to one) at 507. Conversely, in accordance with various embodiments of the present systems and methods, when the high line feature is selected the user can either select a specifically supported line service voltage (e.g., 277 VAC, 240 VAC, etc.) or default to the high line voltage range (e.g., 200 to 264 VAC). That is Thus, if it is determined at 506 that a high line service (voltage) is selected, the IHS notifies the PSU (MCU) at 508 to set high line only operation and the selected high line service, such as, with reference to FIG. 3, set high line only operation F7h bit-3 high (to one) and, for 277V service set F7h bit-2 high, for 240V service set F7h bit-1 high or for 230V service set F7h bit-0 high.

Thusly, in accordance with embodiments of process 400 and 500, if the PSU is a dual wattage PSU and is currently operating as a high line PSU, the high line operation may be locked in with no system disruptions, since it is currently operating as a high line PSU. Also, under embodiments of the present systems and methods, if the PSU has a single wattage rating (e.g., 800 W) the IHS can set the high line only operation. However, this setting may not take effect until the PS_ON signal is disabled. This allows for the PSU to lock in high line only features, such as input voltage turn-on and turn-off voltages, brown-out voltage settings, and input over-current settings.

Further, embodiments of the present systems and methods may, in the manner noted, utilize a Vin_Good (i.e., voltage input good state) signal as a trigger mechanism for the IHS to monitor. Once the IHS disables PS_ON, the PSU will drop Vin_Good, make the necessary changes, and reassert Vin_Good to notify the IHS that the high line only changes have been incorporated.

Also, in accordance with various embodiments of the present systems and methods, if the PSU has no input voltage and the PSU's secondary is back-biased by another PSU, the high line only function status can be read or programmed.

Further, in accordance with embodiments of the present systems and methods, such as described above, a PSU may be removed from a high line IHS, and the PSU installed in an IHS that does not support high line only operation. In such embodiments, although the feature(s), such as highline only settings and line settings restored in non-volatile memory (of the PSU MCU), the PSU can be reset to initial factory default settings by applying input voltage to the PSU with its output connector not being connected. This allows the PSU to see a PS_Kill signal in its default high state, resulting in a reset of the non-volatile memory of the PSU.

Additionally, since a PSU can be removed from a system that has the High Line only function set and placed in a system that requires the flexibility of a wide range operation (100-240 VAC), a method is provided to reset the PSU. Therefore, whenever the PSU is in a stand-alone state with PS_Kill not being pulled low, and the input voltage is above the minimum specified operational voltage (e.g., 90 VAC), the high line only feature will reset to initial factory settings.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An information handling system power supply unit comprising:
    a power train configured to convert electrical energy received by the power supply unit into electrical energy usable by the information handling system; and
    a microcontroller comprising non-volatile memory comprising a line status register, the microcontroller configured to:
    set the power supply unit for high line only operation in response to a determination the power supply unit is established as a high line power supply and the power supply unit is a dual wattage rated power supply as a function of line status; or
    reset the power supply unit for high line only operation in response to a determination the power supply unit is set as a high line only power supply unit in the line status register.

2. The power supply unit of claim 1, wherein the microcontroller is further configured to set the power supply unit for high line only operation by:
    determining whether the information handling system has set a highline operation only function for the power supply unit;
    determining a current line status of the power supply unit, whether the power supply unit is established as a high line power supply and whether the power supply unit is a dual wattage rated power supply as a function of line status; and
    disabling a low line capability of the power supply unit, in response to a determination the power supply unit is established as a high line power supply and the power supply unit is a dual wattage rated power supply as a function of line status.

3. The power supply unit of claim 2, wherein the microcontroller is further configured to set the power supply unit for high line only operation by setting an input turn-off voltage of the power supply unit to a highline minimum turn-off voltage set by the information handling system.

4. The power supply unit of claim 1, wherein the microcontroller is further configured to set the power supply unit for high line only operation by:
- determining whether the power supply unit is established as a low line power supply and whether the power supply unit is a dual rated power supply as a function of line status;
- disabling the power supply unit, in response to a determination the power supply unit is established as a low line power supply or a determination the power supply unit is not a dual rated power supply as a function of line status;
- maintaining the power supply unit in a current operational state until a PS_ON signal from the information handling system is disabled or high line only bits in the line status register are cleared;
- de-asserting an indication that input voltage meets minimum input voltage requirements, in response to PS_ON being disabled, if the indication that input voltage meets minimum input voltage requirements is asserted, then setting low line settings to high line settings in the line status register; and
- asserting the indication that input voltage meets minimum input voltage requirements, in response to the low line settings being set to the high line settings in the line status register and the input voltage meeting a minimum input voltage turn-on level.

5. The power supply unit of claim 1, wherein the microcontroller is further configured to disable the power supply unit through a PS_ON signal.

6. The power supply unit of claim 1, wherein the microcontroller is further configured to reset the power supply unit for high line only operation by:
- determining whether the power supply unit is set as a high line only power supply unit in the line status register, whether the information handling system has issued a notification to the power supply unit to clear high line operation in the line status register, whether the power supply unit is off due to low input voltage and whether the power supply unit is currently capable of operating on a high line input voltage;
- clearing a high line only operation in the line status register and assert Vin_Good in response to a determination the power supply unit is off due to low input voltage and the input voltage meeting a minimum low line input requirement;
- disabling the power supply by de-asserting PS_ON in response to the power supply unit being set as a high line only power supply unit in the line status register;
- maintaining the power supply unit in a current operational state until PS_ON is disabled or the information handling system sets high line only operation;
- de-asserting an indication that input voltage meets minimum input voltage requirements and disabling high line only settings in the line status register, in response to PS_ON being de-asserted;
- asserting the indication that input voltage meets minimum input voltage requirements, in response to disabling high line only settings in the line status register and the input voltage meeting a minimum input voltage turn-on level.

7. The power supply unit of claim 1, wherein the microcontroller is further configured to reset high line only operation of the power supply unit outside the information handling system, wherein when PS_Kill is not pulled low and input voltage to the power supply unit is above a minimum specified operational voltage of the power supply unit, the microcontroller resets high line only line status register bits to default settings.

8. The power supply unit of claim 1, wherein the line status register comprises high line only operation settings comprising:
- a universal high line voltage setting, based at least in part on a nominal voltage range capability of the power supply unit; and
- one or more specific high line voltage settings based, at least in part, on a nominal voltage range capability of the power supply unit.

9. (An information handling system power supply unit input voltage operation management method comprising:
- setting, by a power supply unit microcontroller, the power supply unit for high line only operation in response to a determination, by the power supply unit microcontroller, the information handling system has set a highline operation only function for the power supply unit; and
- resetting, by the power supply unit microcontroller, the power supply unit for high line only operation in response to a determination, by the power supply unit microcontroller, that the power supply unit is set as a high line only power supply unit in a line status register of the power supply unit microcontroller.

10. The method of claim 9, wherein setting the power supply unit for high line only operation further comprises determining, by the power supply unit microcontroller, whether the information handling system has set a highline operation only function for the power supply unit and in response to a determination the information handling system has set a highline operation only function for the power supply unit, setting, by the power supply unit microcontroller, the power supply unit for high line only operation.

11. The method of claim 10, wherein setting the power supply unit for high line only operation in response to a determination the information handling system has set a highline operation only function for the power supply unit further comprises:
- determining a current line status of the power supply unit, whether the power supply unit is established as a high line power supply and whether the power supply unit is a dual wattage rated power supply as a function of line status; and
- disabling a low line capability of the power supply unit, in response to a determination the power supply unit is established as a high line power supply and the power supply unit is a dual wattage rated power supply as a function of line status.

12. The method of claim 9, further comprising determining, by the power supply unit microcontroller, whether the power supply unit is established as a low line power supply and whether the power supply unit is a dual rated power supply as a function of line status, and in response to a determination the power supply unit is established as a low line power supply and the power supply unit is a dual rated power supply as a function of line status, setting, by the power supply unit microcontroller, the power supply unit for high line only operation.

13. The method of claim 12, wherein setting the power supply unit for high line only operation in response to a determination the power supply unit is established as a low line power supply and the power supply unit is a dual rated power supply as a function of line status further comprises:

disabling the power supply unit, in response to a determination the power supply unit is established as a low line power supply or a determination the power supply unit is not a dual rated power supply as a function of line status;

maintaining the power supply unit in a current operational state until a PS_ON signal from the information handling system is disabled or high line only bits in the line status register are cleared;

de-asserting an indication that input voltage meets minimum input voltage requirements, in response to PS_ON being disabled, if the indication that input voltage meets minimum input voltage requirements is asserted, then setting low line settings to high line settings in the line status register; and asserting the indication that input voltage meets minimum input voltage requirements, in response to the low line settings being set to the high line settings in the line status register and the input voltage meeting a minimum input voltage turn-on level.

14. The method of claim 9 wherein resetting the power supply unit for high line only operation further comprises determining, by the power supply unit microcontroller, whether the power supply unit is set as a high line only power supply unit in the line status register, whether the information handling system has issued a notification to the power supply unit to clear high line operation in the line status register, whether the power supply unit is off due to low input voltage and whether the power supply unit is currently capable of operating on a high line input voltage and in response to a determination that the power supply unit is set as a high line only power supply unit in the line status register, the information handling system has issued a notification to the power supply unit to clear high line operation in the line status register, the power supply unit is off due to low input voltage or the power supply unit is currently capable of operating on a high line input voltage, resetting, by the power supply unit microcontroller, the power supply unit for high line only operation.

15. The method of claim 14, wherein resetting the power supply unit for high line only operation in response to a determination the power supply unit is set as a high line only power supply unit in the line status register, the information handling system has issued a notification to the power supply unit to clear high line operation in the line status register, the power supply unit is off due to low input voltage or the power supply unit is currently capable of operating on a high line input voltage, further comprises:

clearing a high line only operation in the line status register and assert Vin_Good in response to a determination the power supply unit is off due to low input voltage and the input voltage meeting a minimum low line input requirement;

disabling the power supply by de-asserting PS_ON in response to the power supply unit being set as a high line only power supply unit in the line status register;

maintaining the power supply unit in a current operational state until PS_ON is disabled or the information handling system sets high line only operation;

de-asserting an indication that input voltage meets minimum input voltage requirements and disabling high line only settings in the line status register, in response to PS_ON being de-asserted; and asserting the indication that input voltage meets minimum input voltage requirements, in response to disabling high line only settings in the line status register and the input voltage meeting a minimum input voltage turn-on level.

16. The method of claim 9, further comprising:

determining whether the power supply unit is mismatched with another power supply unit in the information handling system; and toggling, in response to a determination that the power supply unit is mismatched with another power supply unit in the information handling system, an indication that input voltage of the power supply unit meets minimum input voltage requirements, enabling resetting of the power supply unit.

17. The method of claim 9, further comprising resetting high line only operation of the power supply unit outside the information handling system, by the microcontroller resetting high line only line status register bits to default settings, in response to PS_Kill not being pulled low and input voltage to the power supply unit being above a minimum specified operational voltage of the power supply unit.

18. The method of claim 9 wherein in response to setting or resetting highline only operation for the power supply unit in the information handling system, the method further comprises:

determining, by the information handling system, whether high line only operation has been enabled;

notifying, by the information handling system, the power supply unit to clear one or more high line only bits in the power supply unit line status register, in response to a determination high line only operation has not been enabled;

determining, by the information handling system, whether a high line service voltage is selected, in response to a determination high line only operation has been enabled;

notifying, by the information handling system, the power supply unit to set one or more high line only bits in the power supply unit line status register, in response to a determination a high line service voltage is not selected; and notifying, by the information handling system, the power supply unit to set a high line service voltage bit corresponding to a selected high line service voltage in the power supply unit line status register, in response to a determination the high line service voltage is selected.

19. An information handling system comprising:
a power supply unit comprising:
a power train configured to convert electrical energy received by the power supply unit into electrical energy usable by the information handling system; and
a microcontroller comprising non-volatile memory comprising a line status register;
the information handling system configured to notify the power supply unit microcontroller to set the power supply unit for high line only operation by setting one or more high line only bits in the power supply unit line status register; and
the microcontroller configured to reset the power supply unit for high line only operation.

20. The information handling system of claim 16 wherein the information handling system, in response to setting highline only operation for the power supply unit in the information handling system, is further configured to:
determine whether high line only operation has been enabled;

notify the power supply unit to clear one or more high line only bits in the power supply unit line status register, in response to a determination high line only operation has not been enabled;

determine whether a high line service voltage is selected, in response to a determination high line only operation has been enabled;

notify the power supply unit to set one or more high line only bits in the power supply unit line status register, in response to a determination a high line service voltage is not selected; and notify the power supply unit to set a high line service voltage bit corresponding to a selected high line service voltage in the power supply unit line status register, in response to a determination the high line service voltage is selected.

\* \* \* \* \*

UNITED STATES PATENT AND TRADEMARK OFFICE
CERTIFICATE OF CORRECTION

| | |
|---|---|
| PATENT NO. | : 11,726,547 B1 |
| APPLICATION NO. | : 17/660292 |
| DATED | : August 15, 2023 |
| INVENTOR(S) | : Wayne Kenneth Cook |

It is certified that error appears in the above-identified patent and that said Letters Patent is hereby corrected as shown below:

In the Claims

In Column 18, Line 15, Claim 9, delete "(An information handling system power supply unit" and insert --An information handling system power supply unit-- therefor.

Signed and Sealed this
Twelfth Day of September, 2023

Katherine Kelly Vidal
*Director of the United States Patent and Trademark Office*